March 21, 1950 R. A. FAY 2,501,036
DRILL JIG
Filed June 11, 1945 2 Sheets-Sheet 1
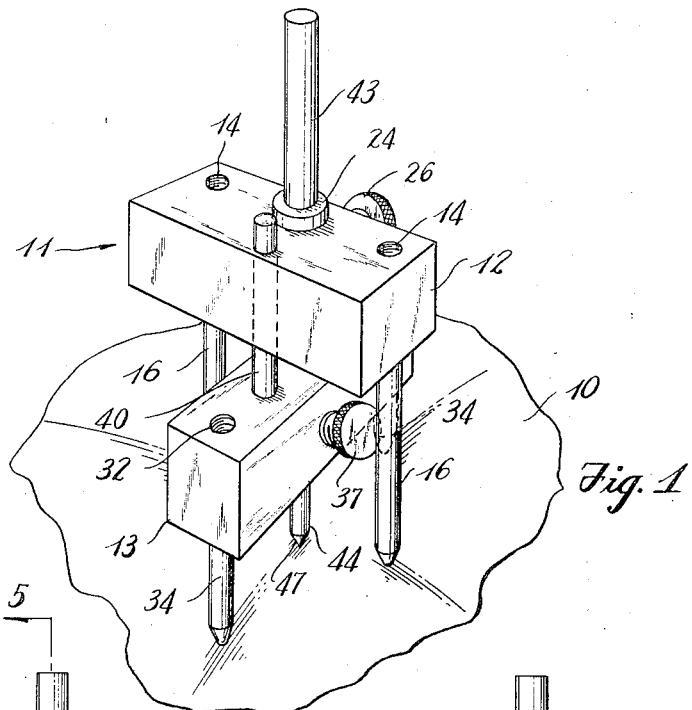
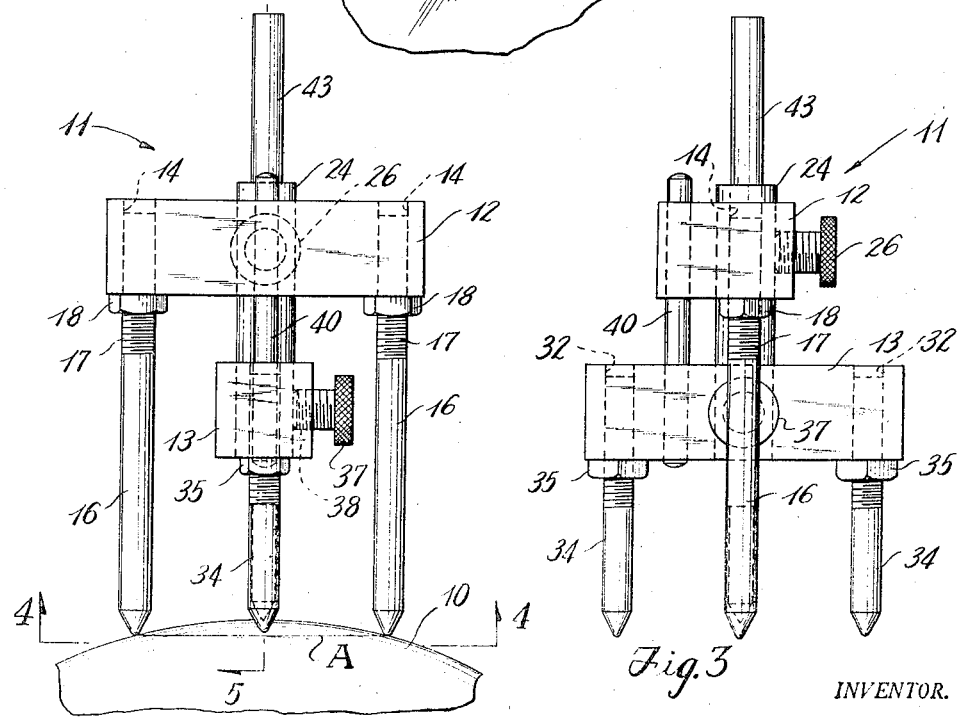
Fig. 1
Fig. 2
Fig. 3
INVENTOR.
ROBERT A. FAY
BY
Attorney March 21, 1950 R. A. FAY 2,501,036
DRILL JIG Filed June 11, 1945 2 Sheets-Sheet 2

INVENTOR.
ROBERT A. FAY
BY
Attorney

Patented Mar. 21, 1950

2,501,036

UNITED STATES PATENT OFFICE 2,501,036

DRILL JIG

Robert A. Fay, Akron, Ohio, assignor to Northrop Aircraft, Inc., Hawthorne, Calif., a corporation of California Application June 11, 1945, Serial No. 598,735

5 Claims. (Cl. 77—62)

1

This invention relates to a device for drilling holes normal to the surface of compound-curved articles such as master tooling jigs or the like, and for installing and checking bushings therein.

The master tooling jigs referred to are used extensively in the aircraft industry in setting up production drill jigs for drilling sheet metal assemblies or parts that have been formed to a compound-curved shape, and they are usually built up of solid wood or plaster, carefully shaped to the exact contour of the airplane part. The holes which are to be drilled in the sheet metal parts or assemblies are then laid out on the master jig, bushing holes are drilled, and the bushings inserted therein. The production drill jigs are generally made up of steel tubing bent to follow the contour of the master jig along a line of bushings, with annular fittings welded thereto in centered relationship over each of the bushings. Locating pins are inserted through the annular fittings into the bushings in the master jig, and drill bushings are placed on the pins. The space between the drill bushing and the surrounding annular fitting is then filled with a low melting point alloy or a casting plastic, and when the locating pins are removed, the drill jig bushings remain fixed in exact relationship to the bushings in the master jig.

From the foregoing, it is seen that the accuracy of the production drill jigs depends entirely on the accuracy of the master jigs. If the bushings are set into the master jig at a slant, the drill jig made from the master jig will produce holes which are correspondingly slanted, and rivets driven in such slanted holes are unsatisfactory. Hence, it is essential that the bushings in the master jig be installed normal to the surface within extremely close tolerances. Heretofore, it has been the practice to set the bushings more or less by guesswork, sighting them in by eye or aligning them with scales, square blades, etc., but this method has been both slow and inaccurate, and has necessitated resetting a large percentage of the bushings.

It is a primary object of the present invention, therefore, to provide a device for quickly and easily drilling holes normal to a compound-curved surface and setting bushings therein to a higher degree of accuracy than heretofore obtainable.

Another object of the invention is to provide a device which can be used with a hand drill or bench drill on the production line to drill holes in curved parts or assemblies where a high degree of accuracy is required in maintaining the holes normal to the surface of the work.

Still another object of the invention is to provide a device of the character described that is simple, inexpensive, and convenient to use.

Other objects and advantages of the present invention will become apparent to those skilled in the art after reading the following detailed description of a preferred embodiment thereof, reference being had to the drawings, in which:

Fig. 1 is a perspective view of a device embodying the principles of my invention;

Fig. 2 is a side elevational view of the same;

Fig. 3 is an end view of the same;

Figure 4:
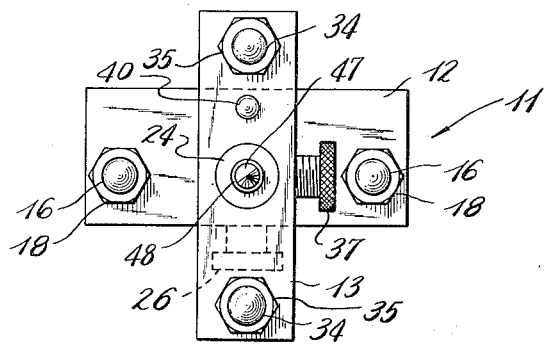
Fig. 4 is a bottom view as seen along the line 4—4 in Fig. 2.

In the drawings, the reference numeral 10 designates a master jig having a compound-curved surface into which jig bushings are to be installed normal to the surface. My device is indicated in its entirety by the reference numeral 11 and comprises an upper cross head 12 and a lower cross head 13 which are spaced apart vertically and arranged at 90° to one another. The upper cross head 12 is preferably in the form of a horizontal bar of rectangular cross-section having threaded holes 14 extending through its ends from top to bottom. The holes 14 are offset to one side of the center line of the bar, and centering legs 16, which are threaded at 17, are screwed into the holes from the bottom and are secured by lock nuts 18. The bottom ends of the legs 16 are tapered to round-nosed points which give substantially point contact engagement with the surface of the work.

Midway between and in line with the centering legs 16, the upper cross head 12 is drilled through vertically to form a bore 22 which receives a sleeve bushing 24. The bushing 24 is slidable within the bore and is secured therein by a knurled-head set screw 26 which is screwed into a threaded hole 27 formed in the side of the cross head and intersecting the bore 22.

The bushing 24 extends downwardly from the upper cross head 12 and is slidably received at its lower end in a vertical bore 30 in the lower cross head 13. The lower cross head 13 is similar to the upper cross head 12 and comprises a horizontal bar of square cross-section having threaded holes 32 spaced equidistant from the bore 30 on opposite sides thereof. Centering legs 34 are screwed into the holes 32 and secured by lock nuts 35, and the bottom ends of these legs are tapered to round-nosed points in the same manner as legs 16. The bushing 24 is fixed to the lower cross head 13 by a knurled-head set screw 37 which is screwed into a threaded hole 38 in the side of the bar and engages the side of the bushing.

The upper and lower cross heads are maintained at right angles to one another by means of a guide rod or dowel pin 40 which is pressed into a hole 41 in the lower cross head 13 and projects upwardly therefrom parallel to the bushing 24. The upper end of the rod 40 extends through and is slidable in a hole 42 in the upper cross head 12.

Figure 5:
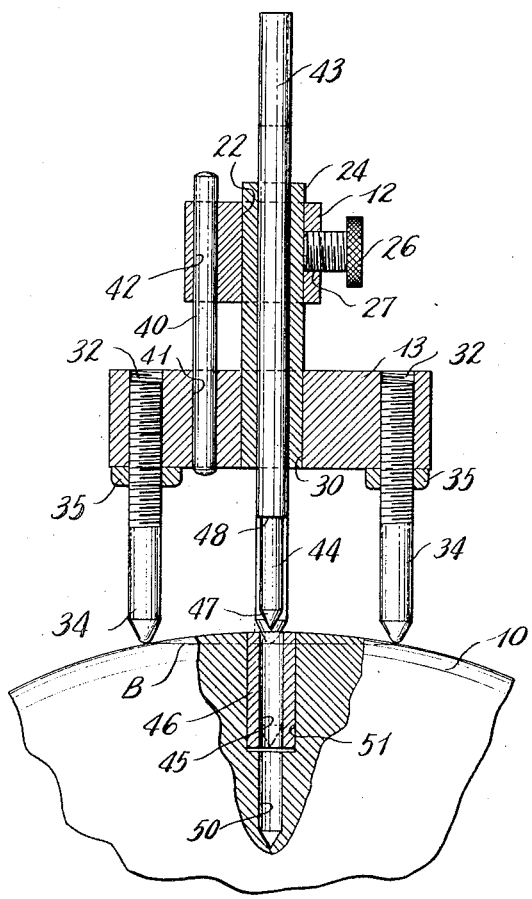
Fig. 5 is a sectional view taken along the line 5—5 in Fig. 2.

The bushing 24 is adapted to receive any suitable operating tool such as a drill bit (not shown) or a bushing arbor 43, for the purpose of guiding the same relative to the work. The lower end of the arbor 43 is reduced in diameter at 44 to fit into the bore 45 of a jig bushing 46 (see Fig. 5) and to furnish a shoulder at 48 which engages the top end of the bushing to drive the latter down into its hole. The lower extremity of the arbor 43 is tapered to a point at 47 to facilitate loading the bushing 46 onto the arbor.

The preferred procedure in installing bushings in a master jig 10 is to drill a quarter-inch pilot hole 50 in the jig, using the device to guide the drill bit into the work. This is accomplished by loosening the set screw 26 to permit the top cross head 12 carrying the legs 16 to slide freely up and down on the bushing 24, and then centering the device over the scribed hole center, using the pointed arbor 43 to locate the device directly over the hole center. The four legs of the device are then brought to bear on the work by first engaging legs 34 with the surface 10, and then sliding the cross head 12 up or down until the legs 16 both engage the surface 10, after which the set screw 26 is tightened again. The arbor 43 is removed from the bushing 24 and the bit of a drill is inserted in its place and fed into the master jig 10 to drill the pilot hole 50. The drill bit is then removed and replaced by a counter boring bar (not shown) having a quarter-inch pilot which is guided by the pilot hole 50. The counter boring bar is fed into the work to bore a hole 51 slightly longer than the bushing 46 and of a diameter such that the bushing is a light press fit in the hole.

The counter boring bar is then removed from the bushing 24 and replaced by the arbor 43. A bushing 46 is loaded onto the arbor and is pressed into the hole 51, using light hammer blows on the top end of the arbor. When the bushing is in place, the arbor 43 is withdrawn and the device removed.

Perpendicularity of the bushing 46 to the surface of the master jig results from the fact that the axis of the bushing 24 is exactly centered beween each pair of legs 16 and 34 and is constructed perpendicular to both of two base lines A and B connecting the contact points of each pair of legs 16 and 34. Since each pair of legs engages the surface of the jig 10 on a curve of the surface running through the axis of the bushing, the base lines A and B represent chords of circles drawn on the surface of the work 10. Thus, the base line A is the chord of a circle in one direction of curvature of the surface 10, while the base line B is the chord of another circle in the direction of curvature at right angles to the first circle. Except in the case of spherical surfaces, the base lines A and B will be at different levels. It is a well known principle of geometry that the perpendicular bisector of the chord of a circle passes through the center of the circle and that a line passing through the center of a circle is perpendicular to the tangent of the circle at the point of intersection of the line with the circle. When two intersecting lines at right angles to one another are drawn on a curved surface through a given point thereon, a line perpendicular to both of said lines at said point is substantially normal to the surface. While this statement holds exactly true only for special surfaces in which the radius of curvature along both of the lines is uniform, it will be found to hold with sufficient accuracy in the great majority of all jig and fixture work to satisfy even the exacting requirements of the aircraft industry, and any error caused by departure of the curvature from a true circle will usually be negligible, since the distance between the contact points of the legs is only a few inches, whereas the radius of curvature is generally much greater. From this it is seen that any drilling, counter boring, or bushing installation operation which is guided along the axis of the bushing 24 is maintained substantially normal to the surface of any compound curved surface with a high degree of accuracy, and exactly normal when the curvature in both directions is uniform.

While I have shown and described in some detail a preferred form of my invention, it will be evident to those skilled in the art that various modifications may be made in the construction and arrangement of my device without departing from the fundamental principles involved, and it is to be understood that these details are not restrictive except as set forth in the appended claims.

I claim:

1. A device for performing operations substantially normal to the surface of a compound-curved article, said device comprising a guide member adapted to freely receive and guide a removable operating tool relative to said article, a first pair of centering legs attached to said guide member and engageable with the surface of said article on opposite sides of the axis of the guide member equidistant therefrom, and a second pair of connected centering legs, and mounting means for said legs engaging and slidable axially along said guide member and engageable with the surface of said article on opposite sides of and equidistant from the axis of the guide member, said axis of the guide member being perpendicular to the base line connecting the lower ends of each pair of centering legs said legs being mounted so that said base lines are perpendicular to each other.

2. A device for performing operations substantially normal to the surface of a compound-curved article, said device comprising a tubular guide bushing adapted to receive and guide a removable operating tool relative to said article, a first pair of centering legs connected to said guide bushing and engageable with the surface of said article on opposite sides of the axis of the bushing and equidistant therefrom, and a second pair of centering legs, leg mounting means movably connecting said second pair of centering legs with said guide bushing for parallel movement with respect to said bushing, said second pair of legs being engageable with the surface of said article on opposite sides of and equidistant from the axis of the bushing, said second pair of legs being disposed in a plane perpendicular to the plane of said first pair of legs, and said axis of the guide bushing being perpendicular to the base line connecting the lower ends of each pair of centering legs said legs being mounted so that said base lines are perpendicular to each other.

3. A device for performing operations substantially normal to the surface of a compound-curved article, said device comprising a tubular guide bushing adapted to receive and guide a removable operating tool relative to said article, a first cross head slidably mounted on said bushing, said cross head having a pair of centering legs spaced on opposite sides of and equidistant from the axis of said bushing, a second cross head slidably mounted on said bushing and disposed at a right angle to said first cross head, said second cross head having a pair of centering legs spaced on opposite sides of and equidistant from the axis of said bushing, and means for securing both said cross heads to said bushing, the axis of said bushing being perpendicular to the base line connecting the lower ends of each pair of centering legs said legs being mounted so that said base lines are perpendicular to each other.

4. A device for performing operations substantially normal to the surface of a compound-curved article, said device comprising a tubular guide bushing adapted to receive and guide a removable operating tool relative to said article, a first cross head slidably mounted on said bushing, said cross head having a pair of centering legs spaced on opposite sides of and equidistant from the axis of said bushing, a second cross head slidably mounted on said bushing at right angles to said first cross head, said second cross head having a pair of centering legs spaced on opposite sides and and equidistant from the axis of said bushing, and means for securing both of said cross heads to said bushing, the axis of said bushing being perpendicular to the base line connecting the lower ends of each pair of centering legs said legs being mounted so that said base lines are perpendicular to each other.

5. A device for performing operations substantially normal to the surface of a compound-curved article, said device comprising a tubular guide bushing adapted to receive and guide a removable operating tool relative to said article, a first cross head slidably mounted on said bushing, said cross head having a pair of centering legs spaced on opposite sides of and equidistant from the axis of said bushing, a second cross head slidably mounted on said bushing at right angles to said first cross head, means on one of said crosss heads slidably engaging the other cross head to maintain said cross heads in 90° angular relationship, said second cross head having a pair of centering legs spaced on opposite sides of and equidistant from the axis of said bushing, and means for selectively securing said cross heads to said bushing, the axis of said bushing being perpendicular to the base line connecting the lower ends of each pair of centering legs said legs being mounted so that said base lines are perpendicular to each other.

ROBERT A. FAY.

REFERENCES CITED

The following references are of record in the file of this patent:

UNITED STATES PATENTS

| Number | Name | Date |
|---|---|---|
| 108,890 | Deatrick | Nov. 1, 1870 |
| 153,102 | Miles | July 14, 1874 |
| 681,375 | Reed | Aug. 27, 1901 |
| 688,310 | Jakway | Dec. 10, 1901 |
| 741,364 | Ott | Oct. 13, 1903 |
| 751,763 | Wagor | Feb. 9, 1904 |
| 853,468 | Nygren | May 14, 1907 |
| 889,273 | Thomas | June 2, 1908 |
| 901,152 | Churchill | Oct. 13, 1908 |
| 948,523 | Perkins | Feb. 8, 1910 |
| 1,682,150 | Sklarek | Aug. 28, 1928 |
| 1,758,959 | Messel | May 20, 1930 |
| 1,920,839 | Cattaneo | Aug. 1, 1933 |
| 2,333,134 | Whitlock | Nov. 2, 1943 |